XR 3,831,035

United States Patent

Hill

[11] 3,831,035

[45] Aug. 20, 1974

[54] SWITCHING NETWORK FOR INFORMATION CHANNELS, PREFERABLY IN THE OPTICAL FREQUENCY RANGE

[75] Inventor: Bernhard Hill, Hamburg, Germany

[73] Assignee: U.S. Philips Corporation, New York, N.Y.

[22] Filed: Feb. 5, 1973

[21] Appl. No.: 329,691

[30] Foreign Application Priority Data

Feb. 9, 1972 Germany .......................... 2206098

[52] U.S. Cl. ................ 250/578, 350/3.5, 350/96 B

[51] Int. Cl. ...................... H01j 39/12, G02b 27/00

[58] Field of Search ...................... 350/3.5, 162 SF; 340/173 LT; 250/220, 578; 307/117

[56] References Cited

UNITED STATES PATENTS

| | | | |
|---|---|---|---|
| 3,499,703 | 3/1970 | DeBitetto | 350/3.5 |
| 3,593,029 | 7/1971 | Sakaguchi et al. | 350/3.5 |
| 3,614,192 | 10/1971 | Preston | 350/3.5 |
| 3,630,594 | 12/1971 | Gorog | 350/3.5 |
| 3,640,604 | 2/1972 | Yarnell | 350/3.5 |
| 3,647,959 | 3/1972 | Schlesinger et al. | 350/3.5 |
| 3,666,345 | 5/1972 | Maslowski | 350/3.5 |

*Primary Examiner*—Ronald J. Stern
*Attorney, Agent, or Firm*—Frank R. Trifari; Simon L. Cohen

[57] ABSTRACT

The invention relates to a switching network for selectively interconnecting input channels and output channels, in which between the optical outputs of the input channels and the optical inputs of the output channels a light deflection system is provided which is controllable in steps or in a digital manner. This light deflection system connects optically, in accordance with the angle of incidence of an object light beam one or more of the optical outputs to one or more of the correspondingly arranged optical inputs.

4 Claims, 11 Drawing Figures

3831035
OR IN 250/578

SWITCHING NETWORK FOR INFORMATION CHANNELS, PREFERABLY IN THE OPTICAL FREQUENCY RANGE

The invention relates to a switching network for selectively interconnecting input and output channels through intermediary light beams.

The growing need for private and commercial information exchanges imposes increasing demands as regards bandwidth and number of data switching and data transmission systems.

The progress in the field of fiber optics and semiconductor lasers announces the birth of a completely new technology in the field of data transmission by which the transmission of data at a band-width of 50 or even 100 GHz can perhaps be realized in the future by means of a single fibre optical cable.

At present attempts are being made to solve the problems in the switching of data which are associated with this increase in bandwidth by the development of purely electronically operating exchanges.

For an exchange for 10,000 video telephones, a bandwidth of a plurality of MHz should be used per channel so as to ensure reliable transmission. In the case of dense traffic, such a system would have to operate with a bandwidth in excess of 10 GHz.

On the other hand, file stores are known which operate on optical principles. Given optical components, for example, digital laser beam deflectors and erasable storage holograms developed for such file stores can also be used for solving the data switching problem.

Switching systems comprising digital light deflectors in conjunction with time multiplex systems are known. The overall bandwidth for such an exchange is limited by the highest pulse rate which can be transmitted by the electronic components. These electro-optical multiplex systems, consequently, are suitable for a large number of channels having a comparatively small bandwidth.

The invention has for its object to provide selective interconnection, in pairs or in groups, of two or more of a multitude of large bandwidth information channels. Such an object relates, for example, to switching networks for switching input channels to output channels in multiplex computer systems or large data banks, and to the switching of videophone signals.

This object of the invention is realized in that between the optical outputs of the input channels and the optical inputs of the output channels a light deflection system which can be controlled in steps or in a digital manner is provided, the said light deflection system connecting one or more of the optical outputs to one or more of the correspondingly arranged optical inputs in accordance with the angle of incidence of an object light beam. The term "optical" is not restricted to the visible wavelength range, but covers also the adjacent infrared and ultraviolet ranges.

Storage holograms are preferably used as light deflectors, i.e., arrangements in which an optical interference pattern can be stored in an erasable manner. The stored interference pattern can then be used for directional modulation of incident light by diffraction.

In contrast with conventional switching techniques, the connected data channels are not grouped in the system according to the invention. All channels are equivalent and can be interconnected at random on one switching level. In addition, all information input channels can be simultaneously connected to one output channel each, i.e. simultaneous use of all channels is possible.

The transmission bandwidth of each individual channel is theoretically limited by the frequency-dependency of the diffraction at the hologram. A non-monochromatic light source produces a wider diffraction spectrum which become disturbing, however, only if they excessively reduce the desired resolution of neighboring diffraction beams. Below a bandwidth of 1 percent of the light frequency the limitation of the bandwidth of each channel is imposed in practice by other system components, such as photo-detectors and light modulators. Light modulation and demodulation systems for bandwidths in excess of 1 GHz were already realized. For a large matrix of light modulators a bandwidth of 10 MHz can be readily realized according to the present state of the art. In conjunction with a storage matrix of merely 10,000 holograms, this already gives an overall bandwidth of 100 GHz which could be dealt with by the system.

The invention will be described in detail with reference to the accompanying diagrammatic drawings.

FIGS. 1*a* and *b* show circuit diagrams of the switching network,

Figure 5:
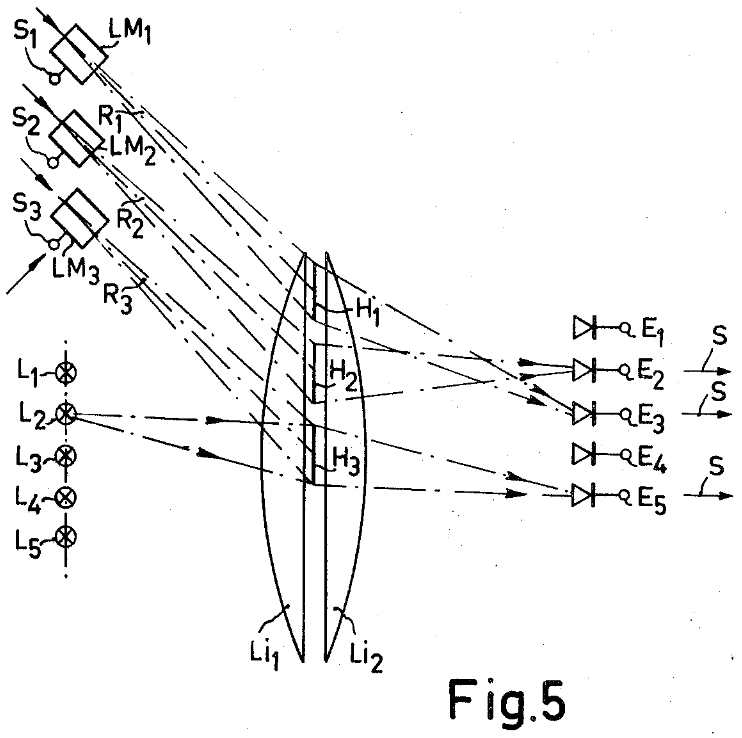
Figure 6:
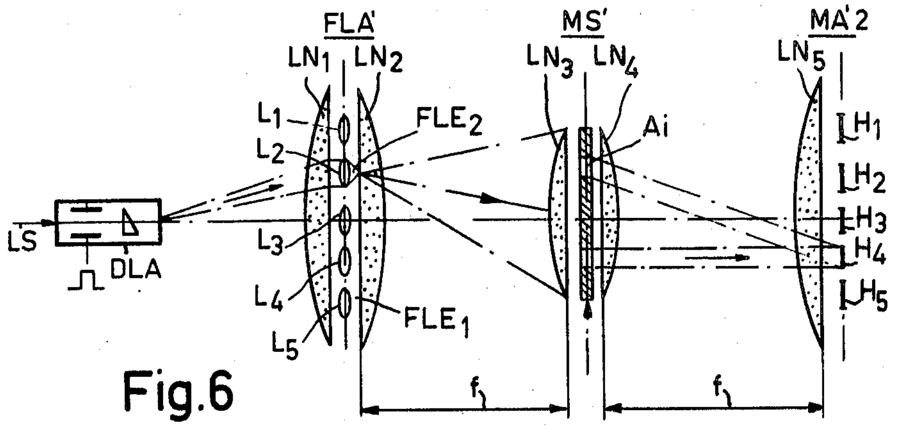
Figure 7:
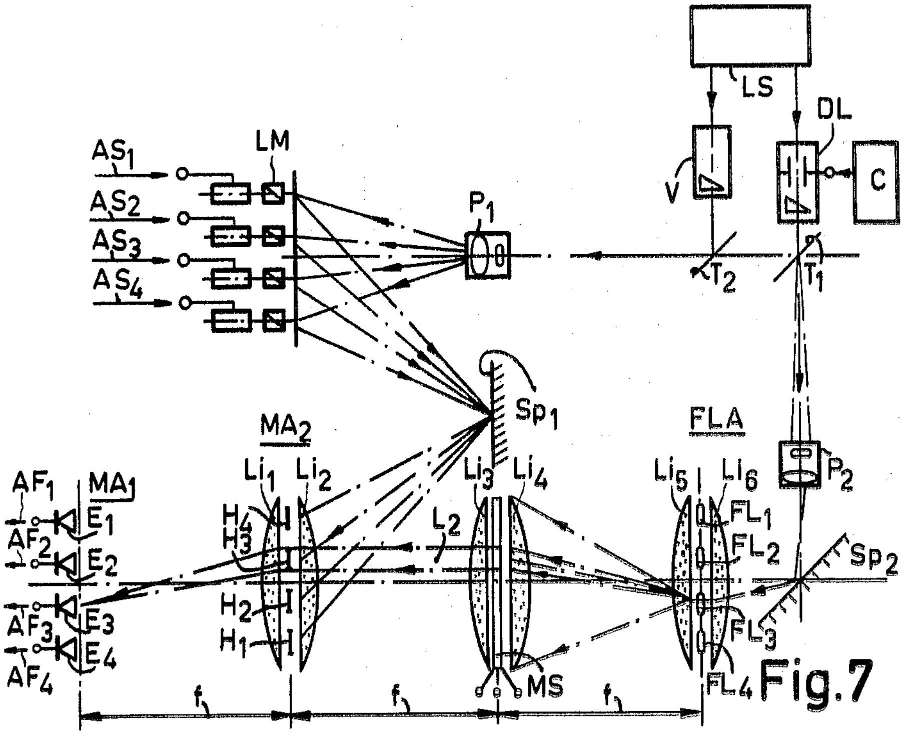
Figure 8A:
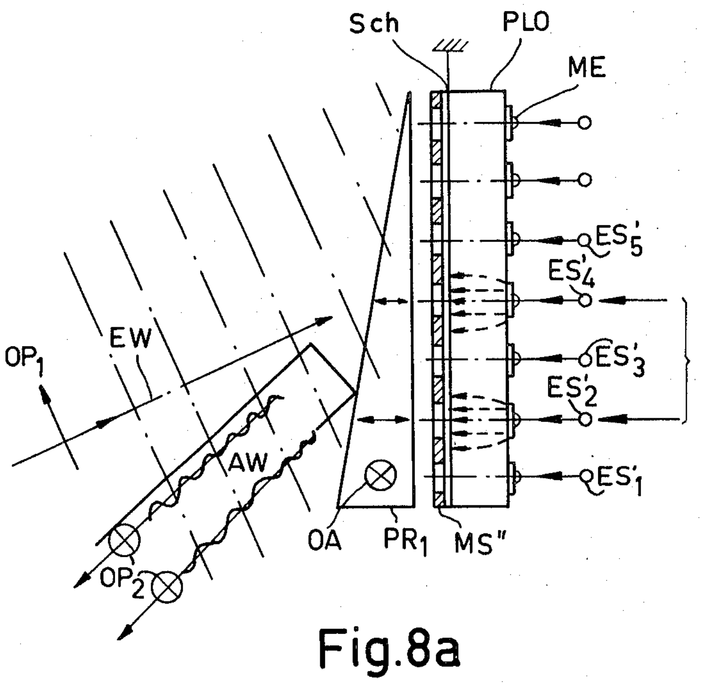
Figure 8B:
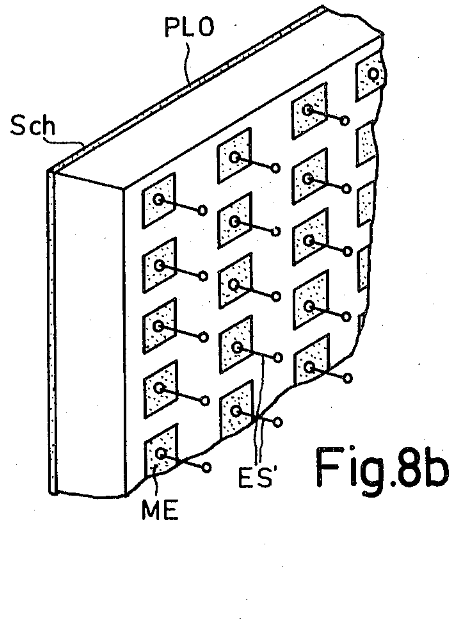
Figure 9:
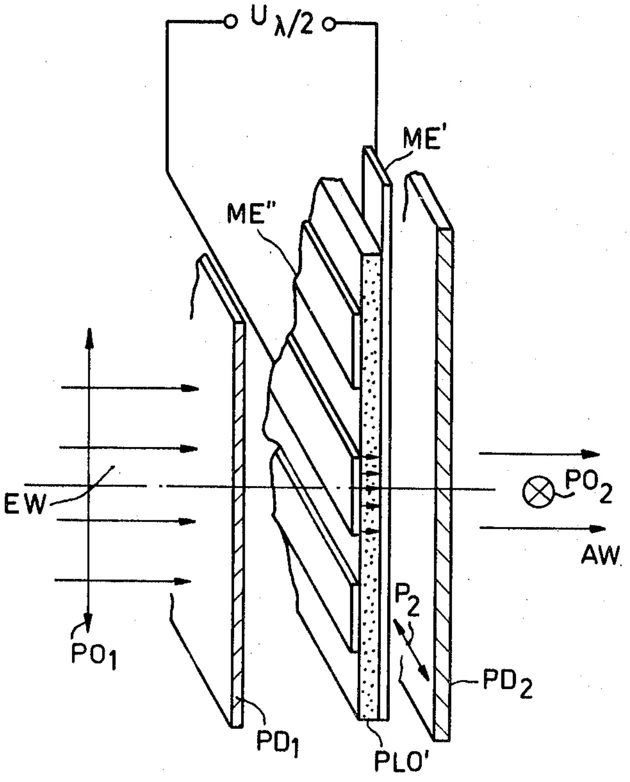

FIG. 5 is a diagrammatic representation of the switching between various input channels and output channels, FIG. 6 shows an arrangement for the selective illumination of a hologram in a hologram matrix, FIG. 7 shows an optical switching system comprising digital light deflectors and storage holograms, FIGS. 8*a* and *b* show a diagram of an input matrix of electrooptic transducers, and FIG. 9 shows a mask having electronically controllable transparency.

Figure 1A:
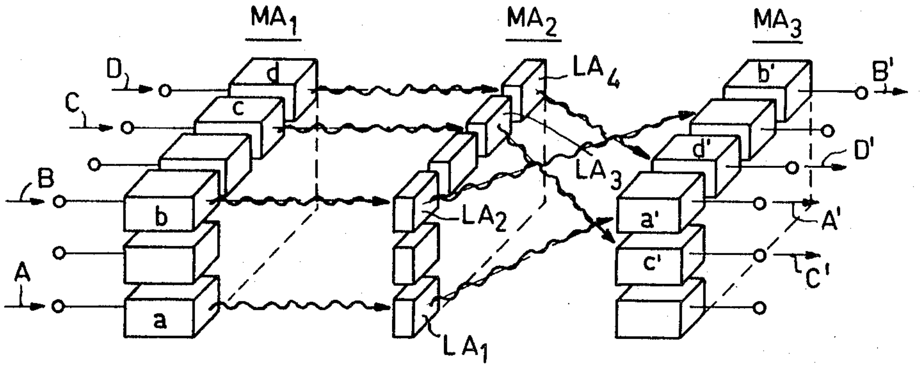

The description of the optical switching principle will be based on the FIGS. 1*a* and *b*. All data channels connected to the switching system are arranged as input channels A...D which supply information, and as output channels A'...D' which carry off information. The former group of channels is connected to a matrix MA1 of input units. In the case of electrical information input, the input units consist of electrooptic transducers *a...d*. Each input unit then generates a light beam which is modulated in synchronism with the input data. This input unit matrix is followed by a matrix MA2 comprising light deflectors LA1...LA4. These deflectors are capable of deflecting any input light beam in a direction which can be chosen at random. The light beams thus deflected are collected in an output matrix MA3 comprising photoreceivers *a'...d'*. These receivers act as optoelectronic transducers and transfer the received data to the group of output channels A'...D'.

Figure 1B:
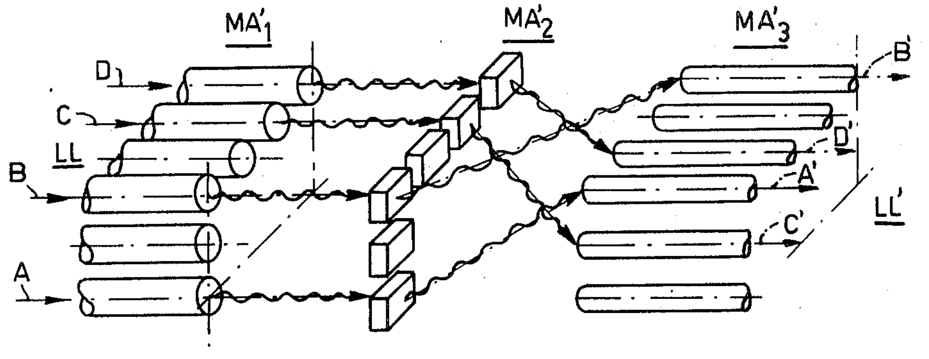

In the case of a purely optical operation (FIg. 1*b*) the input matrix MA'1 is formed, for example, by the end of a fiber optical cable comprising many light conductors LL, the light of which is coupled into the system. Coupling-out is optically effected in a second fiber optical cable LL' for the output information (matrix MA'3). path The number of light deflection in the switching matrix corresponds to the number of input channels connected to the system. For example, for 10,000 input channels 10,000 light deflectors are required. Consequently, the light deflection processes used must be as simple and as inexpensive as possible, for example, acoustically controllable digital light deflectors, the light beam deflection or angle variation of which is digitally performed, or reflection mirror matrices, at the individual mirrors of which a step-wise control of the movement of the reflection plane can be effected.

Storage holograms of the kind forming the basis of optical file stores present a very simple solution.

Such storage holograms are dimensioned in the order of 1 mm diameter, i.e. a matrix comprising 10,000 of such holograms is dimensioned only $15 \times 15$ $cm^2$ while adequate clearance still exists between the holograms, i.e. a switching matrix for 10,000 subscribers can be realized on a very small area. The deflection of light via holograms will be described in detail hereinafter.

When two plane coherent light waves R and AW (FIG. 2) are superimposed on a surface 1–1', an interference pattern I having a sinusoidal intensity distribution is produced. The space frequency $F_0$ of this interference pattern is dependent of the angle $\gamma$ between the two plane waves and amounts to:

$$F_0 = \sin\gamma/\lambda,$$

in which $\lambda$ is the light wavelength. The recording of the interference pattern in an optical recording medium material is called a two-beam interference hologram which represents an optical diffraction grid. Consequently, if the hologram is again illuminated by the plane light wave R, light is diffracted in diffraction beams of order zero and plus or minus one.

Figure 3:
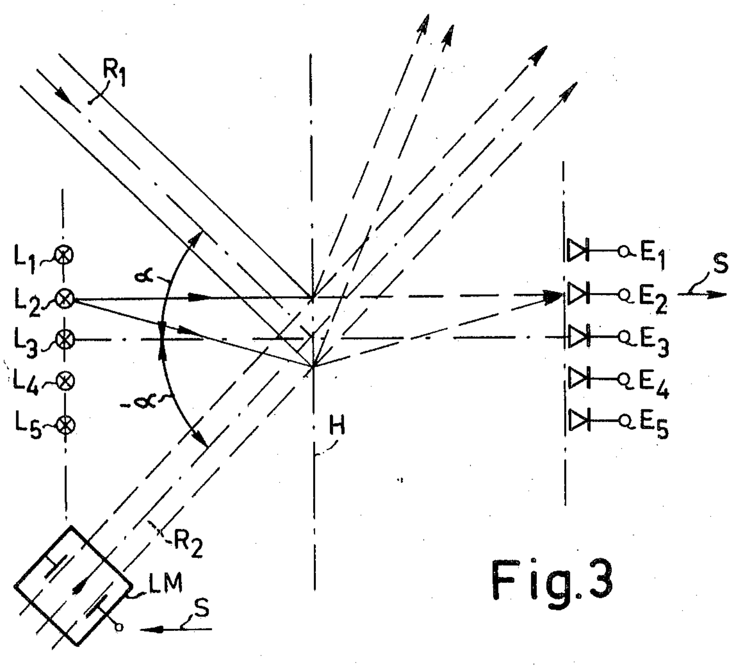
FIG. 3 shows the principle of optical switching by light deflection.
Figure 4:
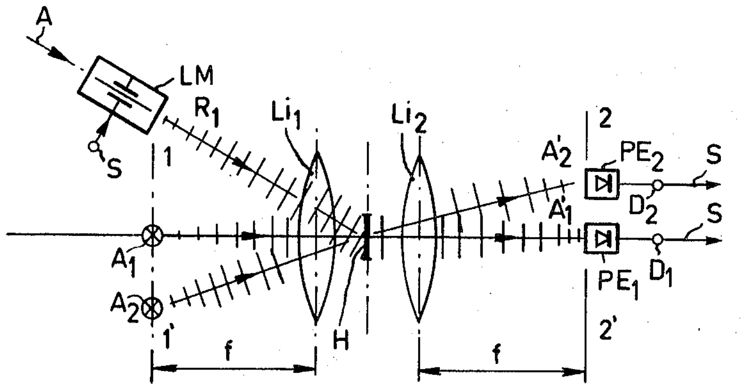
FIG. 4 shows the principle of switching by means of a storage hologram.

The operation of such a recording and reconstruction light wave arrangement is shown in FIGS. 3 and 4. FIG. 3 shows a number of coherent light waves L1...L5, a storage hologram H, a number of photodetectors E1.-..E5, and a light modulator LM. Using the arrangement shown, the signal S on the input of the light modulator LM must be selectively applied to one of the receivers $E_1...E_5$. For example, if the receiver $E_2$ must be actuated, first a reference light beam $R_1$ is used to record a hologram of the coherent light source $L_2$ which is associated with the receiver $E_2$ in a mirror-image manner. The technique of recording such a hologram is known.

Following the recording of the hologram, the reference beam $R_1$ and the light beam $L_2$ are switched off, and a second reference beam $R_2$ is switched on. The latter beam is influenced by the hologram H such that part of its light is diffracted to receiver $E_2$. In addition, higher-order diffractions arise in known manner, but these do not reach the detector arrangement. If the reference beam $R_2$ is then modulated with the signal S, this signal is optically transmitted to the receiver $E_2$ by way of the hologram. A subsequent change of the transmission path, for example, to receiver $E_4$ can be performed such that the hologram H of the light source $L_2$ is erased and that instead a hologram of the light source $L_4$ is recorded etc.

Holograms in which information can be recorded and erased are known in principle. The relevant techniques are presently being developed for use in holographic file stores. The storage medium used for this purpose are thin magnetic layers (for example, manganese bismuth), photochrome materials, thermoplastic materials, electrooptic crystals, or elastomeres. The time required for recording a hologram amounts to nanoseconds when manganese bismuth is used as the storage material, and to a number of seconds when thermoplastic materials are used. When used is made of the latter material, the diffraction efficiency can amount, for example, up to 10 percent.

The technique of light modulation and the detection of modulated light beams is known. Transmission bandwidths of 100 MHz correspond to the state of the art.

The reference beam $R_2$ can also be an incoherent light beam. The beam $R_1$ and the light sources $L_1...L_5$, however, must be coherent.

In FIG. 4 two coherent point light sources $A_1$ and $R_1$ are arranged in the focal plane on the entrance side of a lens $Li_1$ for recording. The lens changes the produced spherical waves into plane waves which are superimposed in the hologram H on the righthand side of the lens $Li_1$.

For the reconstruction only the point light source $R_1$ is switched on. The three diffraction beams are then produced behind the hologram, the first diffraction beam being focussed through the lens $Li_2$ to a light spot $A'_1$ in the focal plane 2–2'. This reconstructed light point represents the image of the recorded object point $A_1$.

In the data switching application, the hologram functions as a light deflector which deflects the light of the beam $R_1$ to the point $A'_1$, the light modulator LM modulating the laser beam LS with the signal S.

If the position of the point $A_1$ is shifted to $A_2$ during the recording of the hologram, the position of the reconstructed image point $A'_1$ is point-symmetrically shifted to $A'_2$, or in other words: the deflection angle is changed as a result of a change of the space frequency of the interference pattern.

The described hologram arrangement can be readily extended to form an electrooptic switching network of a switching system. To this end, photo-receivers $PE_1$, $PE_2$ are associated with the reconstructed image points $A'_1$ and $A'_2$, and the incident light wave $R_1$ is modulated by means of the light modulator LM. In accordance with the selection of a light source $A_1$ or $A_2$ for the recording of the hologram, the signal S is selectively transmitted to the receiver $D_1$ or $D_2$.

If not one but a plurality of holograms are arranged in the hologram plane, a plurality of reference beams can be simultaneously deflected by the holograms, i.e. a plurality of signals can be switched simultaneously.

A modification of the arrangement shown in FIG. 4 is shown in FIG. 5. The latter Figure again shows coherent light sources $L_1...L_5$ and receive detectors for the output channels $E_1...E_5$. In addition, three light modulators are provided for three input channels with the signals $S_1...S_3$. Instead of one hologram, three holograms $H_1$, $H_2$, $H_3$ are shown. The holograms are now arranged between lenses $Li'_1$ $Li'_2$, the focal lengths of which are chosen such that for each of the holograms the same reference beam can be used for recording and reconstructing.

The establishment of a connection, for example, between the input channel $S_1$ and the output channel $E_3$ is effected in the same manner as in the arrangement shown in FIG. 3, but now the same reference beam is used for recording the hologram and for carrying the signal. According to this mode of connection, all the input channels can be connected to output channels thus using the arrangement shown in FIG. 5 selective and simultaneous transmission is possible between a plurality of input channels and a plurality of output channels.

The holograms can have practical dimensions of 0.5 ... 1 $mm^2$. A large number of such holograms (for example, 10,000) can be accommodated on a comparatively small surface area (for example, 15 × 15 $cm^2$) It is thus possible to switch the information of thousands of input channels by means of a comparatively small hologram matrix.

The arrangement shown in FIG. 5, however, has a drawback. This is because a switched-on light source $L_1$...$L_5$ illuminates all holograms simultaneously. At a given instant of recording a hologram procedure only this particular hologram should be illuminated. Transmission paths which are already in operation can otherwise be disturbed by the recording of a hologram. This drawback is eliminated in the system shown in FIG. 6.

This system comprises a laser, a digital light deflector DLA, a fly's eye lens FLA', an electronically switchable mask MS', the matrix MA'2 comprising holograms $H_1$...$H_5$, and special lens systems $LN_1$...$LN_5$.

The laser beam LS is first deflected by a digital light deflector DLA to an arbitrary single lens FLE of the fly's eye lens FLA'. This single lens, for example, $FLE_2$, having a short focal length, spatially broadens the beam which, consequently, illuminates the total area of the switching mask MS'. The lens $LN_2$ serves to deflect the center of the beam to the center of the switching mask. The lenses $LN_1$ and $LN_3$ act as collimators. As a result, the light beam which is divergent before the lens $LN_3$ enters the switching mask MS' as a plane wave, the switching mask being transparent to the light only at a given location $A_i$. This illuminated hole represents the light source required for hologram recording, and the light is focussed onto the surface of a hologram by means of the lens $LN_4$.

When the location of the hole $A_i$ in the switching mask MS' is changed, the same hologram $H_4$ as previously is illuminated, but the illuminating wave is incident on the hologram at a different angle. In accordance with a number of $N^2$ desired recording positions, switching mask is divided into N × N areas, the transparency of which can be electronically changed over at random from non-transparent to transparent or conversely.

The two lenses $LN_3$ and $LN_4$ form an optical imaging system between the plane of the fly's eye matrix F1A' and the hologram plane, i.e. each illuminated single lens F1E of the lens matrix F1A' is imaged on a particular one of the holograms $H_1$...$H_5$. The number and the arrangement of the holo-grams corresponds exactly to the number and arrangement of the single lenses of the fly's eye lens matrix F1A'. Therefore, if another single lens is illuminated due to the switching over of the light deflector DLA, another hologram is illuminated.

FIG. 7 illustrates the input channels $AS_1$...$AS_4$ with the associated light modulators LM, which in practice are arranged in the form of a matrix, the output channels $AE_1$...$AE_4$ with their photodetector matrix MA1 and the hologram matrix MA2. The system shown in FIG. 7 furthermore comprises a digital light deflector DL, a passive beam splitter T1, a mask MS of electronically switchable transparency, and a fly's eye lens F1A (lens matrix). For a description of the system first the transmission of the signal S to the receivers E, already described with reference to the FIGS. 3 and 5, will be explained, it being assumed that the holograms $H_1$...$H_4$ have already been recorded in accordance with the desired connection.

A light beam LS is split into N beams by a passive beam multiplier V. The letter N (N = 4 in FIG. 7) denotes the number of input channels. Passive beam splitters consisting of double-refractive prisms or of multiplex phaseholograms are known. The split beam is projected onto the light modulator matrix LM via a beam splitter $T_2$ and projection optics $P_1$. The optical components are adapted such that the beams enter the light modulators in parallel.

FIG. 7 shows symbolically electrooptic light modulators having a reflective end face. The modulated light beams emerge from the modulators in the reversed direction. The modulated beams are coupled out laterally and are projected, by way of a mirror $Sp_1$, onto the hologram matrix MA2. Subsequently, the beams are deflected to the associated receive channels AE1...AE4. At the most N input channels can simultaneously transfer their data to associated output channels. The number N can amount, for example, to 10,000.

Instead of the electrooptic light modulation, other feasible light modulation methods can of course also be used.

The light beams which are applied via the beam splitter V serve only for signal transmission. So as to avoid modification of the stored holograms their light power is accordingly small.

For erasing a hologram or for renewed recording, a second light beam having an essentially higher light power is deflected, by way of a digital light deflector DL which is preferably a laser light deflector, and a beam splitter $T_1$, into the path of the signal transmission. The light deflector is controlled by a control device C such that the additional light beam is incident on a selected one of the holograms after having passed through the modulation arrangement. This control is effected electronically. Digital light deflectors for up to $10^6$ switching positions have already been realized in practice.

For recording, for example, the hologram $H_3$ in FIG. 7, a further light source $L_2$ is required for a desired deflection of the signal light, for example, to the receiver $E_3$. This source is produced in that part of the beam from the light deflector DL illuminates, through the beam splitting mirror $T_1$, by way of projection optics $P_2$, a mirror $Sp_2$ and a lens matrix F1A, a mask MS which comprises a transparent hole at the area $L_2$.

The light beam passes through the lens matrix F1A at a location F13 which is associated with the hologram $H_3$. The lenses $Li_3$, $Li_4$ which are arranged on both sides of the mask MS focus the light which passes through the fly's eye lens F1A at the location $F1_3$, exactly onto the hologram $H_3$. The lenses on both sides of the mask thus form an imaging system between the plane of the lens matrix F1A and the plane of the holograms. When the light deflector DL is controlled to another position, a different lens of the lens matrix F1A is illuminated. The light is then focussed onto a different hologram. In synchronism therewith, the reference beam which is reflected by the light modulation matrix LM is moved to a different hologram $H_1$...$H_4$.

Figure 2:
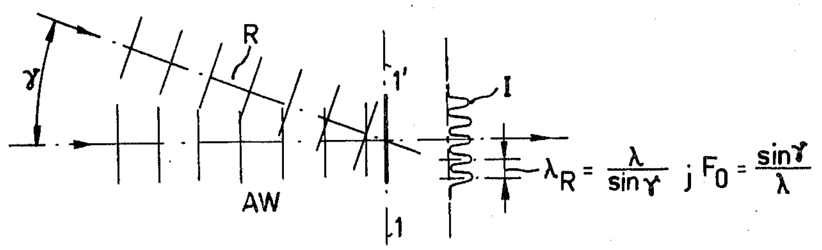
FIG. 2 shows a diagram to illustrate the optical principle.

As in the arrangement shown in FIG. 2, the light source $L_2$ in FIG. 7 is associated with the receive diode $E_3$. If another receive diode is to receive the signal, the mask must comprise a transparent hole at a corresponding other area. The entire area of this mask is illuminated. This is achieved by means of the lens matrix F1A which broadens the incident light beams by means of the single lenses F11...F14.

For recording a hologram for a given input channel, the light deflector DL must be switched to a position in which a given hologram is illuminated. The mask MS must comprise a light transparent hole at a location corresponding to the desired output channel. The location of the transparent area in the mask is preferably electronically controllable.

A practical realization of an input matrix consisting of electrooptic transducers is shown in the FIGS. 8*a* and *b*. This system utilizes the known principle of electrooptic light amplitude modulation. A plate PLO consists of a material having a longitudinal electrooptic effect. Materials having such an effect are available in the form of electrooptic crystals or ferroelectric ceramic. The influence of an electric field on such a material changes the optical double refraction of the material, so that the polarization of an incident light beam can be modulated by the electric field in a controllable manner. To this end, a transparent conductive layer Sch is vapour-deposited as a mass electrode on one side of the plate PLO. The other side of the plate is provided with M × M metal electrodes ME, corresponding to a number of M × M input channels ES'. By means of each of these electrodes the state of the double refraction can be locally modulated by applying a voltage thereto. It is assumed that a linearly polarized light wave having a polarization vector in the plane of the drawing penetrates into the electrooptic plate via a mask MS'' having M × M holes. The light passes through the plate and is reflected by the oppositely arranged metal electrodes ME, so that M × M beams return in the reversed direction and emerge from the plate again.

Arranged in front of the plate is a double-refractive prism PR1 which simultaneously performs the function of a polarizer and that of an analyzer. The optical axis OA of the prism is arranged to be perpendicular to the plane of the drawing. The incident light wave EW, having the polarization direction $OP_1$ in the plane of the drawing, passes through the prism PR1 at a given angle which is governed by the normal refraction index. All parts of the light wave EW whose polarization remains unchanged return in the same direction through the prism PR1 after having passed through the electrooptic plate PLO. All parts of the light have AW emerging from the electrooptic plate having the polarization direction OP2 which is perpendicular to the plane of the drawing, however, are refracted under a different angle and, consequently, emerge from the arrangement at an angle other than that of incident light, because this light is subjected to the extraordinary refraction index. Therefore, in every location where the polarization of the light is modulated in the electrooptic plate due to the influence of a control field, signal modulated beams emerge from the modulation arrangement at a new angle.

This arrangement, comprising M × M parallel light modulators, can be constructed as a very compact component. Due to the double passage of the light through the electrooptic plate, only half the voltage is required for 100 percent modulation as compared with a single passage of the light through an electrooptic modulator.

The switching mask required for the hologram recording arrangement can be made of electrooptic material like the modulation matrix (FIG. 9). Because only a part of the mask is switched at any given instant, it is sufficient to provide an electrooptic plate PLO' with longitudinal electrooptic effect, on both sides with strip-like electrodes ME' and ME'' which are arranged cross-wise. If a voltage U is applied to one of the electrodes on each side of the plate, an electronic control field appears in the material only at the intersection of the two electrodes. At this location the electrooptic material thus becomes double-refractive, assuming that no natural double refraction is present, so that a light wave EW which is incident on the plate at right anges is modulated at this location. When this electrooptic modulation matrix is arranged between crossed polarizers $PD_1$, $PD_2$, i.e. between a polarizer and an analyzer, light AW can emerge from the analyzer $PD_2$ only at the area of the modulated double refraction. $PO_1$ and $PO_2$ denote the polarization directions.

If a binary pulse code is used for the signal transmission, a comparatively high cross-talk can be permitted. The density in the individual matrices can then be very high, for example, on an area of only 40 × 40 $cm^2$ the number of holograms can be increased to $10^5$ if a maximum cross-talk of 10 percent is permitted. The special advantages of the optical data switching systems, i.e. their large bandwidth and the possibility of constructing very compact units having small dimensions in spite of many thousands of feasible connections, can thus become most significant in conjunction with code-modulated signal transmission.

Finally, it is to be noted that within the scope of the invention a matrix consisting of laser diodes can be used in a derivative arrangement instead of the digital light deflector DL. The same applies to the light modulation matrix LM of the input channels which can also be replaced by a matrix consisting of controlled laser diodes within the scope of the invention.

What is claimed is:

1. An optical switching network for selectively interconnecting input channels and output channels through intermediary light beams, comprising an array of light modulators, each of said light modulators comprising a connection for an input channel, means for separately illuminating each of said light modulators with a beam of coherent radiation, each of said light modulators thereby providing a separate output beam of coherent radiation modulated by information on the corresponding channel, an array of photoelectric transducers, each of said photoelectric transducers comprising an output channel, an array of erasable holographic storage elements, means for directing the modulated light beams on to said holographic storage elements, scanning means for deflecting a beam of coherent reference radiation to a plurality of spaced locations, optical means comprising a separate optical element at each of said spaced locations for focussing said reference radiation on a single corresponding hologram of said array of holograms, and for broadening said beam of reference radiation between said separate optical elements and said array of holograms, mask means in the parth of the broadened beam of reference radiation for limiting the transmission path of said beam to a selected number of a plurality of possible transmission paths in the cross-sectional area of said broadened beam of reference radiation whereby the angle with which the coherent reference radiation impinges on said corresponding hologram is selected, the coherent reference radiation and the modulated light beams forming a hologram in said corresponding holographic storage element wherein the angle by which the coherent reference radiation impinged on said corresponding holographic storage element upon readout with said modulated light determines the direction of modulated light emanating from said corresponding holographic storage element, each of said photoelectric transducers being located in the path of the light from said holographic storage elements corresponding to a particular transmission path of said mask means.

2. Apparatus as recited in claim 1 wherein the array of optical elements comprise a fly's eye lens matrix.

3. Apparatus as recited in claim 1 wherein said array of light modulators consists of a plate made of double-refracting electro-optic material, a matrix of metal electrodes on one surface of the electro-optic material for receiving electronic input signals, and a transparent electrode on another surface of the electro-optic material in opposed relationship with said matrix of metal electrodes.

4. Apparatus as recited in claim 1, wherein said mask means comprises a plate made of double-refracting electro-optic material, a first plurality of parallel electrode strips on a surface of said electro-optic material, a second plurality of parallel electrode strips in opposed orthogonal relationship with said first plurality of electrode strips on an opposite surface of the electro-optic material, and means for selectively applying voltages to the electrode strips.

* * * * *

PO-1050
(5/69)

UNITED STATES PATENT OFFICE
CERTIFICATE OF CORRECTION

Patent No. 3,831,035 Dated August 20, 1974

Inventor(s) BERNHARD HILL

It is certified that error appears in the above-identified patent and that said Letters Patent are hereby corrected as shown below:

ON THE TITLE PAGE

"[30] Foreign Application Priority Data

Feb. 9, 1972 Germany...........2206098"

should read

--[30] Foreign Application Priority Data

Feb. 9, 1972 Germany.............P.2206098.6--;

IN THE SPECIFICATION

Col. 2, line 67, cancel "path";

Col. 4, line 6, "used" second occurrence, should be -- use --;

Col. 5, line 56, "holo-grams" should be --holograms--;

IN THE CLAIMS

Claim 1, line 23, "parth" should be --path--;

Signed and sealed this 10th day of December 1974.

(SEAL)
Attest:

McCOY M. GIBSON JR.
Attesting Officer

C. MARSHALL DANN
Commissioner of Patents